United States Patent

Asai

[11] Patent Number: 6,154,291
[45] Date of Patent: *Nov. 28, 2000

[54] DEVICE WITH FACSIMILE FUNCTION AND PRINTER FUNCTION

[75] Inventor: Kazunobu Asai, Nagoya, Japan

[73] Assignee: Brother Kogyo Kabushiki Kaisha, Aichi-Ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/928,513

[22] Filed: Sep. 12, 1997

[30] Foreign Application Priority Data

Sep. 17, 1996 [JP] Japan .................................. 8-244406

[51] Int. Cl.$^7$ .............................. H04N 1/32; H04N 1/40; H04B 1/40
[52] U.S. Cl. .......................... 358/468; 358/1.14; 358/444
[58] Field of Search .................................. 358/468, 442, 358/444, 1.14; 395/113

[56] References Cited

U.S. PATENT DOCUMENTS

| | | | |
|---|---|---|---|
| 4,947,345 | 8/1990 | Paradise et al. | 358/442 |
| 5,194,967 | 3/1993 | Nonomura | 358/434 |
| 5,200,830 | 4/1993 | Imaizumi et al. | 358/296 |
| 5,377,016 | 12/1994 | Kashiwagi et al. | 358/403 |
| 5,592,307 | 1/1997 | Murai | 358/468 |
| 5,740,336 | 4/1998 | Wakisaka et al. | 358/1.14 |
| 5,761,399 | 6/1998 | Asano | 358/1.15 |
| 5,778,162 | 7/1998 | Morisaki | 358/468 |
| 5,796,494 | 8/1998 | Asano | 358/468 |
| 5,798,848 | 8/1998 | Ouchi | 358/468 |
| 5,815,280 | 9/1998 | Ohmura et al. | 358/296 |

*Primary Examiner*—Amelia Au
*Assistant Examiner*—Mehrdad Dastouri
*Attorney, Agent, or Firm*—McGinn & Gibb, P.C.

[57] ABSTRACT

To provide a device with facsimile function and printer function whose memory will not be full of facsimile data even if print data priority mode is turned ON while facsimile data is being received. While facsimile data is being received or printed (S11,S12), if print data is inputted (S13), facsimile data print discontinuation flag is turned ON (S15). On the other hand, if no print data is inputted (S13), or if the print data priority flag is in the OFF state (S14), program is terminated without shifting to print data priority mode (S16). When the facsimile data is not being received nor printed (S11,S12), if the print data priority flag is in the ON state (S14), the facsimile data print discontinuation flag is turned ON (S15). Then, the print data priority mode is turned ON. If the print data priority flag is in the OFF state (S14), the program is terminated without shifting to the print data priority mode (S16).

18 Claims, 5 Drawing Sheets

DEVICE WITH FACSIMILE FUNCTION AND PRINTER FUNCTION

BACKGROUND OF THE INVENTION

1. Field of the Invention

The present invention relates to a device with multi-functions, and more particularly to a facsimile device with printer function capable of printing an image on a recording paper upon receipt of print data that is outputted from a computer or other device.

2. Description of Related Art

There has been provided a device, such as a facsimile device with printer function, with a plurality of kinds of function used for computers. General facsimile devices are provided with a facsimile function portion which carries out driving control of an image forming device according to facsimile data transmitted via a telephone line and the like. A facsimile device with printer function uses its image forming device to print data that is outputted from external devices, such as a computer or a word processor. The image forming device prints facsimile data upon receipt of facsimile data, and prints print data upon receipt of print data transmitted from external devices.

In this kind of facsimile device with a printer function, print data inputted during printing of facsimile data is printed after the facsimile data has been printed. Therefore, a user may have to wait for a long time before starting to print the print data. To overcome such a problem, the facsimile device has a print data priority mode. The print data priority mode is selected by pressing a print data priority mode key provided on an operation panel of the device. That is, the print data priority mode is turned ON just after the print data priority mode key is pressed, whereupon printing of the facsimile data will be discontinued until the print data priority mode is canceled.

The print data priority mode can be canceled in three different ways, that is: when no print data is inputted before expiration of a predetermined time duration, for example, 5 minutes after the print data priority mode is selected by pressing the print data priority mode key; when, after printing print data, no additional print data is inputted before expiration of a predetermined time duration, for example, 1 minute; or when the print data priority mode key is pressed by the user when the print data priority mode is in the ON state.

As described above, if the print data priority mode is selected during receipt of facsimile data, the received facsimile data will not be printed until the print data priority mode is canceled. Therefore, such facsimile data is temporarily stored in a memory. When the print data priority mode is canceled, the facsimile data is retrieved from the memory and printed on paper sheets.

The print data priority mode is turned ON immediately after the user presses the print data priority mode key and, unless the predetermined time duration described above elapses before the user input print data, will remain ON until the user inputs print data and the data is completely printed on the paper sheets. Because the user inputs the print data by manipulating the personal computer and the like, the print data may take a long preparatory time before it can be inputted to the device. That is, the print data may not be inputted by the user until long after the print data priority mode is turned ON. In another words, the print data priority mode may remain in its ON state for a long time. Assuming that the print data priority mode is selected by the user when facsimile data is being received. Because the facsimile data keeps coming in and is stored in the memory, the memory may be filled with the facsimile data. Any facsimile data coming in after the memory is full will not be received so that a transmission error results.

SUMMARY OF THE INVENTION

It is an object of the present invention to solve the above-described problems and to provide a facsimile device with a printer function which prevents a reception memory for storing incoming facsimile data from becoming full even when a print data priority mode is selected while facsimile data is being received.

These and other objects of the present invention will be attained by a device with a facsimile function and a printer function, which includes facsimile data receiving means, print data receiving means, a memory, and control means. The facsimile data receiving means receives facsimile data transmitted from a remote facsimile device. The print data receiving means receives print data inputted from an external device. The printing means prints both the facsimile data and the print data. The first memory includes a first flag and a second flag. When the print data receiving means receives print data while the first flag is in its ON state, the control means turns ON the second flag so that the printing means is set into a print data priority mode. In the print data priority mode, print data is given priority to be printed over facsimile data. The first flag is turned ON when an instruction to set the printing means into the print data priority mode is manually inputted.

Detecting means may further be provided for detecting facsimile data being received by the facsimile data receiving means and facsimile data being printed by said printing means. When the control means turns ON the first flag while the detecting means is detecting facsimile data, the control means turns ON the second flag when the print data receiving means receives print data.

The printing means operates in the print data priority mode after completion of printing of one page worth of facsimile data.

A first timer may be provided for measuring a first predetermined time duration starting from a time when the control means turns ON the first flag while the detecting means is detecting facsimile data. The control means turns OFF the first flag when the first predetermined time duration expires before the print data receiving means receives any print data. A second timer may further be provided for measuring a second predetermined time duration starting from a time when the printing means completes printing print data. The control means turns OFF the first flag and the second flag when the second predetermined time duration expires before the print data receiving means receives subsequent print data.

In another aspect of the present invention, there is provided a device with a facsimile function and a printer function, which includes a facsimile data reception memory, a print data reception memory, a print section, a print data priority mode key, and control means. The facsimile data reception memory receives and stores facsimile data transmitted from a remote facsimile device. The print data reception memory receives and stores print data inputted from an external device. The print section prints the facsimile data and the print data on a print medium. The print data priority mode key instructs to set the print section into a print data priority mode in which the print data is printed precedent to the facsimile data. The control means is adapted to control the print section and includes first detecting means and second detecting means. The first detecting means detects whether or not the print data is being received at the print data reception memory. If the print data is being received, the first detecting means produces a first affirmative output, and if not, produces a first negative output. The second detecting means detects whether or not the print data priority mode is instructed by the print data priority mode key. If the print data priority mode is instructed, the second detecting means produces a second affirmative output, and if not, produces a second negative output. When the first affirmative output and the second affirmative output are produced, the control means sets the print section in the print data priority mode.

The control means may further include third detecting means and forth detecting means. The third detecting means detects whether or not the facsimile data is being received at the facsimile data reception memory. If the facsimile data is being received, the third detecting means produces a third affirmative output, and if not, produces a third negative output. The fourth detecting means detects whether or not the facsimile data is being printed by the print section. If the facsimile data is being printed, the fourth detecting means produces a fourth affirmative output, and if not, produces a fourth negative output. When the first and second affirmative outputs and one of the third and fourth affirmative outputs are produced, the control means set the print section in the print data priority mode.

When the third negative output and the fourth negative output are produced and when the second affirmative output is produced, the control means sets the print section in the print data priority mode regardless of whether the first affirmative output or the first negative output is produced.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENT

A facsimile device with printer function according to a preferred embodiment of the present invention will be described while referring to the accompanying drawings. In the following description, the expressions "front", "rear", "top", and "beneath" are used throughout the description to define the various parts when the facsimile device is disposed in an orientation in which it is intended to be used.

The facsimile device is provided with a printer function in addition to its facsimile function and so can serve as a printer as well as a facsimile machine. In other words, the facsimile device is capable of printing the facsimile data received over a telephone line, for example, and also of printing data received from a personal computer (PC) or word processor.

Figure 1:
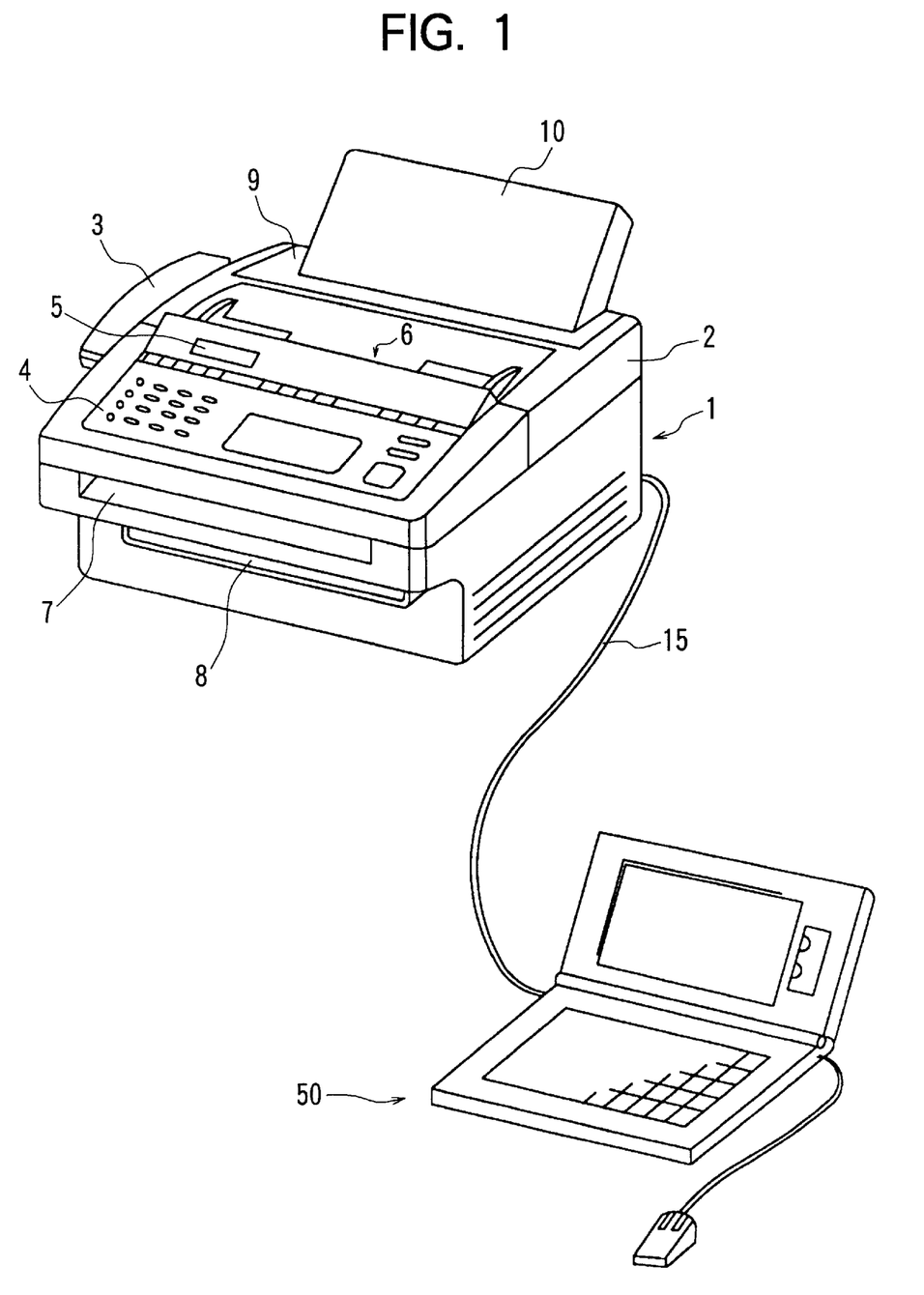
FIG. 1 is a perspective view showing a facsimile device with printer function connected to a personal computer according to an embodiment of the present invention.

FIG. 1 shows a facsimile device 1 connected to a personal computer 50 via a cable 15. The facsimile device includes: a main body 2; a handset 3 mounted on a side portion of the main body 2; an operation panel 4 provided on a top surface of a front portion of the main body 2; and a liquid crystal display (LCD) 5 provided to the rear of the operation panel 4. The main body 2 is also formed with a cassette tray insertion portion 9 at the rear of its top surface; a document insertion portion 6 positioned in front of the cassette tray insertion portion 9; a document discharge portion 7 on a front surface of the main body 2; and a sheet discharge portion 8 beneath the document discharge portion 7. A paper cassette tray 10 is detachably mounted in the cassette tray insertion portion 9.

Although not showing in the drawings, a hook is provided for receiving the handset 3. When the handset 3 is placed on the hook, and so is in an ON-HOOK condition, a telephone line is disconnected. On the other hand, when the handset 3 is picked up off the hook, and so is in an OFF-HOOK condition, the telephone line is connected. The operation panel 4 is provided with various kinds of operation keys including a print data priority mode key. The user operates the various functions of the facsimile device by manipulating the operation keys on the operation panel 4. The LCD 5 displays information relating to these functions. For example, the LCD 5 displays function state, manipulation procedure, and the like.

When the print data priority mode key is pressed, the print data priority mode is selected. In the print data priority mode, print data transmitted from the PC 50 is printed with priority over facsimile data transmitted from remote facsimile devices. The print data priority mode is selected when the user needs to quickly print the print data. Also, the print data priority mode is selected when the user wishes to print the print data on a special kind of paper sheet. In this latter case, in the print data priority mode, even if facsimile data is received just after the user has loaded a special type of sheet in the paper cassette tray 10, but before the user inputs the print data, the facsimile data will not be printed on the special paper sheet. Therefore, the user can reliably print the print data on the desired paper sheet.

Figure 2:
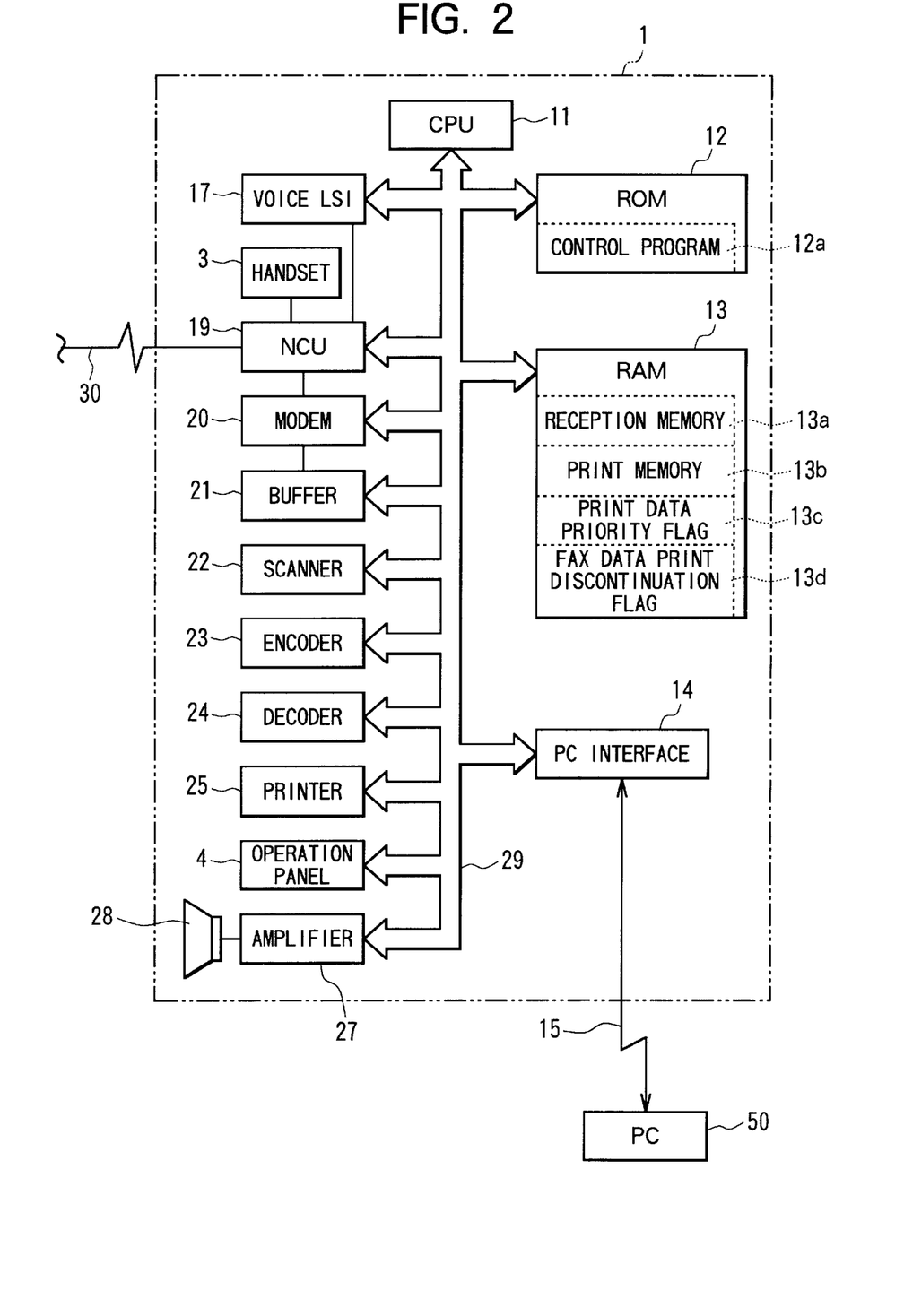
FIG. 2 is a block diagram showing electrical configuration of a control section of the facsimile device in FIG. 1.

An original document which contains information to be transmitted is inserted through the document insertion portion 6 with its document face down. After the information on the original document is read, the original document is discharged out of the main body 2 through the document discharge portion 7. A stack of paper sheet as a print medium is placed in the paper cassette tray 10. Paper sheets in the paper cassette tray 10 are fed into the main body one by one. The paper sheet is discharged through the paper discharge portion 8 after it has been printed on FIG. 2 is a block diagram showing an electric configuration of a control section of the facsimile device 1. The control section includes a CPU 11, a ROM 12, a RAM 13, a PC interface 14, a voice LSI 17, a network control unit (NCU) 19, a modem 20, a buffer 21, a scanner 22, an encoder 23, a decoder 24, a printer, the operation panel 4, and an amplifier 27. All of those are connected to each other via a bus 29.

The CPU 11 controls to perform the facsimile function or the printing function based on data transmitted or received via the NCU 19. The ROM 12 is a read-only memory and stores a control program 12a. A program shown in flowcharts shown in FIGS. 3 to 6 is stored in the ROM 12.

The RAM 13 has a reception memory 13a, a print memory 13b, a print data priority flag 13c, and a facsimile data print discontinuation flag 13d. The reception memory 13a stores facsimile data received from a remote facsimile device via a telephone line. The print memory 13b stores print data transmitted from the PC 50 which is connected to the PC interface 14 via cable 15. The printer 25 prints facsimile data stored in the reception memory 13a and print data stored in the print memory 13b on a print medium. After printing, all data is deleted from the facsimile memory 13a or the print memory 13b. That is, the facsimile memory 13a and the print memory 13b stores facsimile data and print data, respectively, until the data is printed.

The print data priority flag 13c indicates that the print data priority mode should be turned ON. The print data priority flag 13c is turned ON when the print data priority mode key is depressed. On the other hand, the print data priority flag 13c is turned OFF, when the print data priority mode key is depressed while the print data priority flag 13c is in the ON state, or when printing of print data is completed. The facsimile data print discontinuation flag 13d indicates whether the facsimile device is in a print data priority mode. When the facsimile data print discontinuation flag 13d is ON, then the operation mode of the facsimile device is set to the print data priority mode. The facsimile data print discontinuation flag 13d is turned ON, for example, when the print data priority flag 13c is turned ON and print data is inputted from the PC 50 while incoming facsimile data is being received. On the other hand, the facsimile data print discontinuation flag 13d is turned OFF when printing of such print data is completed.

The PC interface 14 is, for example, a parallel interface based on Centronics standards. A connector of the PC interface 14 is exposed on a rear surface of the main body 2 and connected to the PC 50 via the cable 15.

The voice LSI 17 converts an analog voice signal received via the NCU 19 into a digital voice signal. The voice LSI 17 also converts a digital voice signal generated by the facsimile device 1 into an analog voice signal and transmits it to the NCU 19. The modem 20 modulates and/or demodulates image data in order to transmit the data. The modem 20 also transmits and receives various kinds of control signals. The buffer 21 temporarily stores encoded facsimile data for performing transmission and reception with a remote facsimile device, and also stores image data of the document read by the scanner 22.

The scanner 22 reads image data on the original document inserted through the document insertion portion 6. The encoder 23 encodes the image data read by the scanner 22. The decoder 24 retrieves incoming facsimile data stored in the buffer 21 and decodes the data. The decoded data is printed on the paper sheet by the printer 25. The user manipulates the operation panel 4 to input various commands relating to each function. The amplifier 27 outputs call signals and the like in cooperation with the speaker 28 connected thereto. The facsimile device 1 is connected to the telephone line 30 via the NCU 19.

Next, operation processes of the facsimile device 1 will be described while referring to the flowcharts shown in FIGS. 3 to 6. The operation processes include an interval interruption process, a print data priority mode setting process, facsimile data printing process, and a print data printing process. All of these operation processes are executed regularly by the CPU 11. The interval interruption process is a process executed by interrupting another process, in this case, the facsimile data printing process. Details will be described next.

Figure 3:
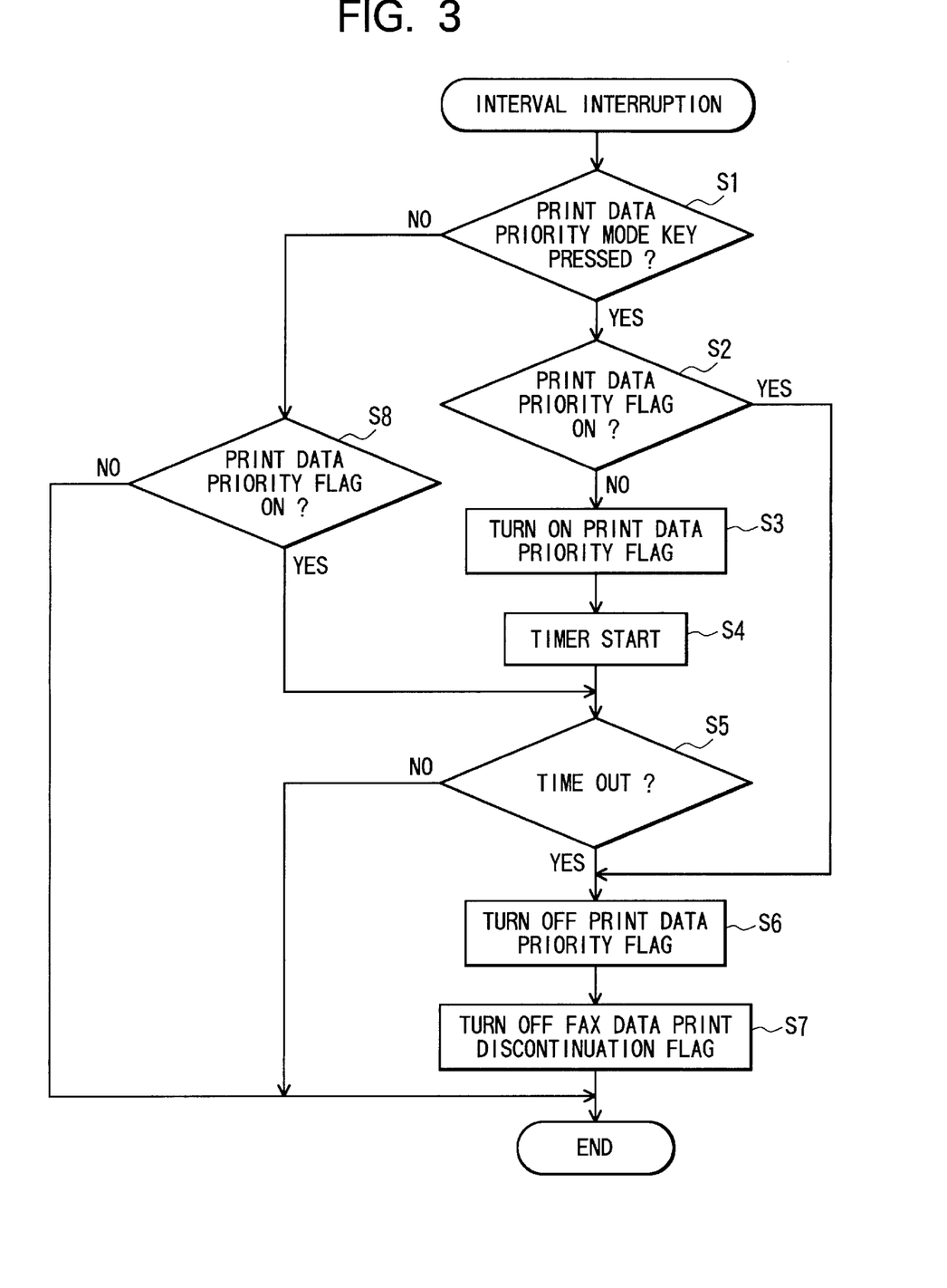
FIG. 3 is a flowchart representing an interval interruption process of the present invention.

First, the interval interruption process will be described while referring to FIG. 3. This interval interruption process is repeatedly executed every time the facsimile data printing process is executed once.

First, the CPU 11 determines in S1 whether or not the print data priority mode key has been depressed. If so (S1:YES), the CPU 11 determines in S2 whether or not the print data priority flag 13c is in the ON state. If not (S2:NO), then in S3 the print data priority flag 13c is turned ON, and in S4 a timer starts measuring a predetermined time duration of, for example, 5 minutes. The user can set the time duration measured by the timer to any desired value. Then, the CPU 11 determines in S5 whether or not the time duration has expired. If so (S5:YES), the print data priority flag 13c is turned OFF in S6. Then, if the facsimile data print discontinuation flag 13d is in the ON state, the facsimile data print discontinuation flag 13d is also turned OFF in S7. The command to turn ON the print data priority mode is canceled. It should be noted that the timer stops measuring the time duration when print data is inputted from the PC 50.

On the other hand, if the print data priority mode key is pressed when the print data priority flag 13c is in the ON state (S1:YES, S2:YES), the program proceeds to S6 and S7 to turn OFF the print data priority flag 13c and to turn OFF the facsimile data print discontinuation flag 13d. If the CPU 11 detects that the print data priority mode key has not been pressed (S1:NO), the CPU further detects in S8 whether or not the print data priority flag 13c is in the ON state. If not (S8:NO) the program is terminated. On the other hand, if S8 is YES, the program proceeds to S5 to determine whether or not the time duration has expired. If so (S5:YES), both the print data priority flag 13c and the facsimile data print discontinuation flag 13d are turned OFF in S6 and S7, respectively. In this way, the command to shift to the print data priority mode is canceled. On the other hand, if the time duration is not expired (S5:NO), the interval interruption process is terminated.

Figure 4:
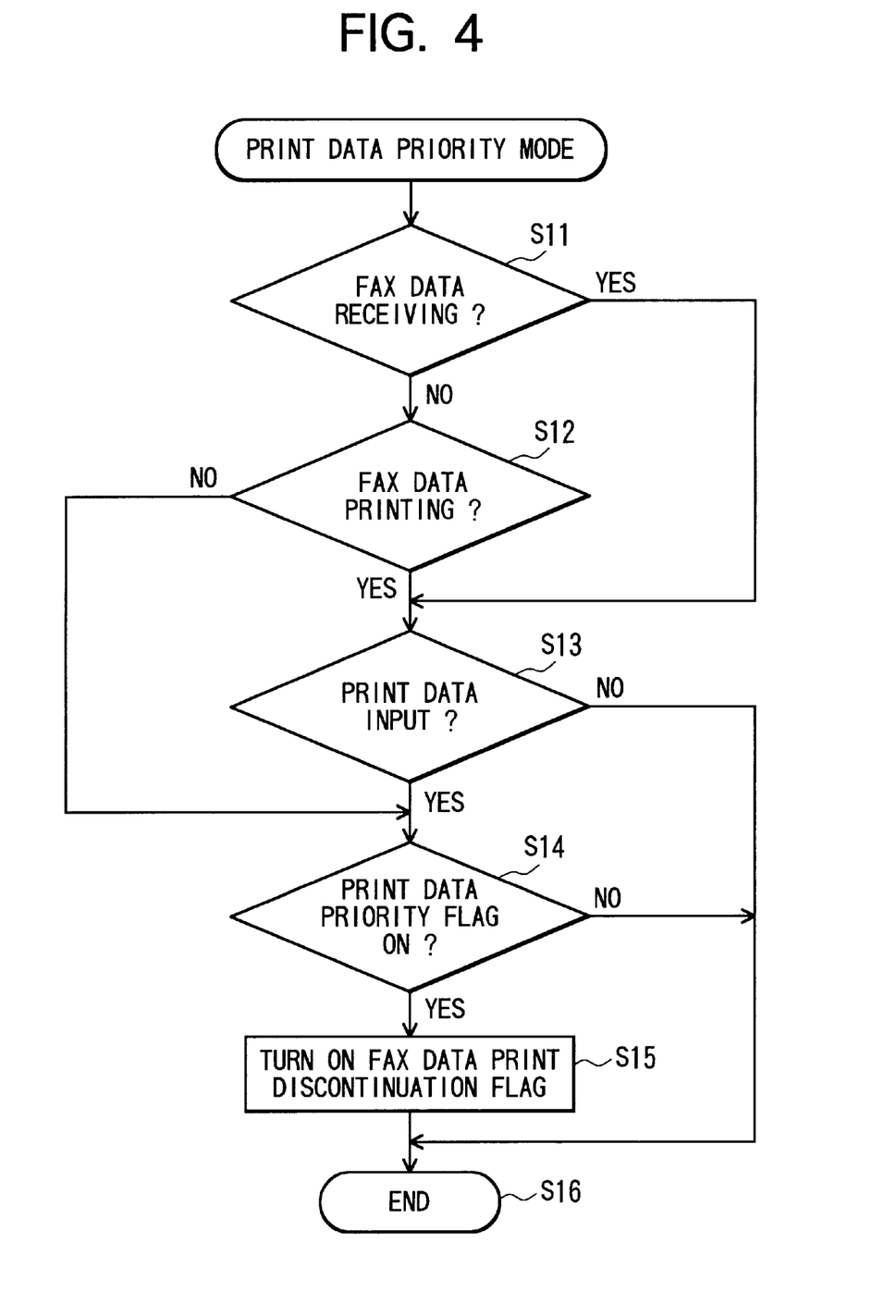
FIG. 4 is a flowchart representing a print data priority mode setting process.

Next, the print data priority mode setting process will be described while referring to FIG. 4. This process turns ON the facsimile data print discontinuation flag 13d when the print data priority flag 13c is turned ON by interval interruption process. The print data setting process is performed periodically by the CPU 11 and is not an interrupt routine.

First, the CPU determines in S11 whether or not incoming facsimile data is being received. If not (S11:NO), the CPU 11 determines in S12 whether or not facsimile data is being printed. If facsimile data is being either received or printed (S11:YES or S12:YES), then in S13 the CPU determines whether or not any print data is being inputted from the PC 50. If so (S13:YES), the CPU determines in S14 whether or not the print data priority flag 13c is in the ON state. If so (S14:YES), the facsimile data print discontinuation flag 13d is turned ON in S15 so that the facsimile device 1 is set to the print data priority mode. On the other hand, if the print data priority flag 13c is in the OFF state (S14:NO), then the program proceeds to S16, whereupon this routine is ended.

Even if incoming facsimile data is being received or printed (S11:YES or S12:YES), unless print data is inputted from the PC 50, that is, if S13 is NO, the facsimile device 1 will not be set to the print data priority mode regardless of the state of the print data priority flag 13c, and the program will be terminated in S16 without turning ON the facsimile data print discontinuation flag 13d. That is, when facsimile data is either being received or being printed, the print data priority mode is turned ON only if print data is actually inputted after the print data priority mode key is pressed.

Therefore, a duration of time that the print data priority mode stays in the ON state can be shortened.

On the other hand, if facsimile data is not being received nor printed (S11:NO, S12:NO), whether or not the print data priority flag 13c is in the ON state is determined in S14. If so (S14:YES), the facsimile data print discontinuation flag 13d is turned ON in S15 regardless of whether print data is inputted or not, whereby the facsimile device is set to the print data priority mode.

With this configuration, the user can reliably print out print data on a desired paper sheet. That is, the print data priority mode is turned ON immediately after the user presses the print data priority mode key. The user then selects the special kind of paper sheet to print out the print data and then places the paper sheet on the paper cassette tray 10. At this point, even if facsimile data is received before the user inputs the print data, the facsimile data will not be printed. Therefore the facsimile data will not be accidentally printed on the special kind of paper sheet. Also, even if the print data priority mode is turned ON immediately after the print data priority mode key is pressed, because no facsimile data has been received at this point, the reception memory 13a will not become filled with facsimile data.

Figure 5:
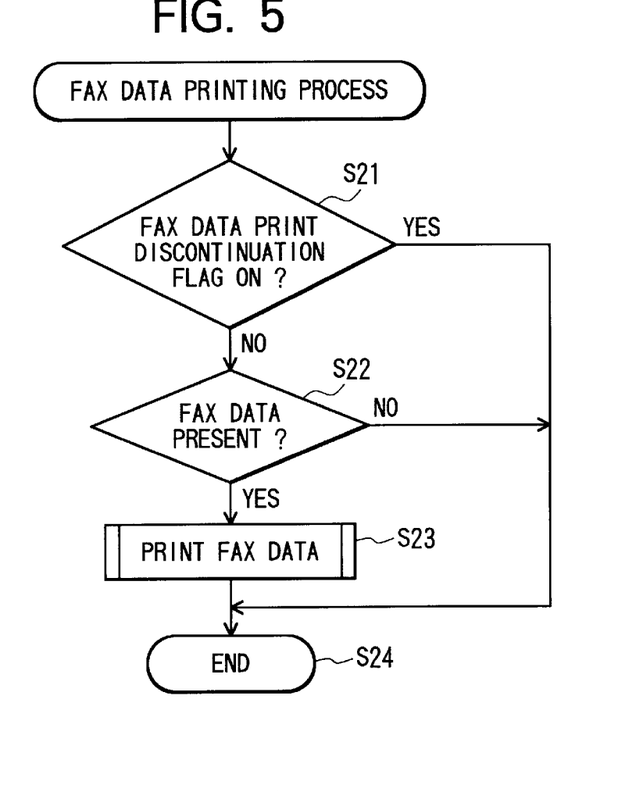
FIG. 5 is a flowchart representing a facsimile data printing process.

Next, the facsimile data printing process will be described while referring to the flowchart in FIG. 5. Each time the facsimile data printing process is executed once, facsimile data is printed for one page. Because the print data priority mode setting process is executed once each time the facsimile data printing process is executed, the print data priority mode can be turned ON any time upon completion of printing the facsimile data for one page. Therefore, printing of facsimile data will not be halted in the middle of the printing on a page, nor will facsimile data and print data be printed on the same sheet.

First, in S21 the CPU 11 determines whether or not the facsimile data print discontinuation flag 13d is in the ON state. That is, the CPU 11 determines whether or not the facsimile device 1 is set to the print data priority mode. If so (S21:YES), the process is terminated in S24 without printing any facsimile data.

On the other hand, if the facsimile data print discontinuation flag 13d is in the OFF state (S21:NO), the CPU 11 determines in S22 whether or not any facsimile data to be printed is stored in the reception memory 13a. If so (S22:YES), the facsimile data is printed on a paper sheet in S23 and then deleted from the reception memory 13a. After the facsimile data is printed for one page, this routine is ended in S24. On the other hand, if no facsimile data is detected in the reception memory 13a (S22:NO), the program proceeds to S24, whereupon this routine is ended.

Figure 6:
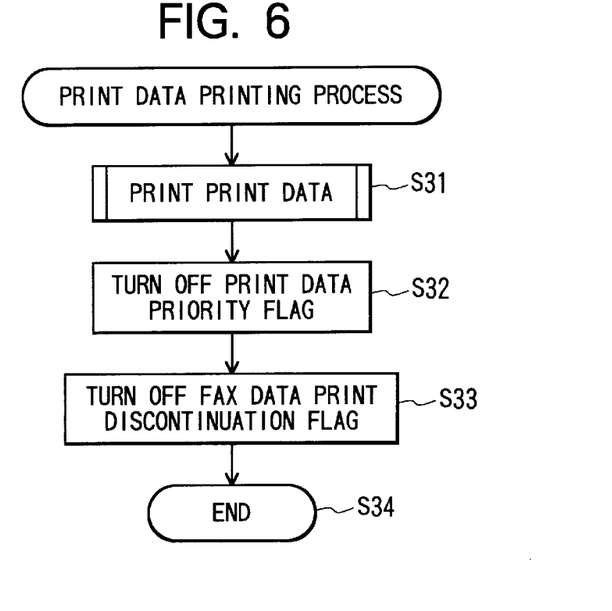
FIG. 6 is a flowchart representing a print data printing process.

Next, the print data printing process will be described while referring to the flowchart in FIG. 6. It should be noted that print data is transmitted from the PC 50 via the PC interface and stored in the print memory 13b. The print data printing process is executed and the print data is detected in the print memory 13d either while no facsimile data is being received nor printed or while the facsimile device 1 is set to the print data priority mode.

In the print data printing mode, first, print data stored in the print memory 13b is printing in S31. At this point, all of the print data, even for a plurality of pages, is printed at one time. If the print data printing mode is being executed when the facsimile device 1 is set to the print data priority mode, a predetermined time duration, for example, one minute, is measured after all of the print data in the print memory 13b is printed. The user can set an amount of the time duration at will. If any additional print data is inputted before the time is expired, the additional print data is also printed.

After printing the print data in S31, both the print data priority flag 13c and the facsimile data print discontinuation flag 13d are turned OFF in S32 and S33, thereby releasing the facsimile machine from the print data priority mode. The routine is then ended in S34.

While the invention has been described in detail with reference to specific embodiments thereof, it would be apparent to those skilled in the art that various changes and modifications may be made therein without departing from the spirit of the invention, the scope of which is defined by the attached claims.

For example, in the above-described embodiment, the facsimile device 1 is set to the print data priority mode after print data is inputted from the PC 50 if the print data priority mode key is pressed during reception or printing of facsimile data. However, the facsimile device 1 is set to the print data priority mode after the print data has been completely inputted. By doing so, the time duration that the facsimile data 1 remains in the print data priority mode can be further shortened. This can more reliably prevent the reception memory 13a from becoming filled with facsimile data which remains unprinted.

Also, an interface based on RS-232C standards can be used instead of Centronics standards. The PC interface can communicate with the PC 50 via infrared signal without using the cable 15.

What is claimed is:

1. A device with a facsimile function and a printer function performed selectively in a print data priority mode in which print data is given priority to be printed over facsimile data, comprising:

facsimile data receiving means for receiving facsimile data transmitted from a remote facsimile device;

print data receiving means for receiving print data inputted from an external device;

printing means for printing the facsimile data and the print data on a print medium;

a first memory including a first flag and a second flag both selectively turned ON and OFF, wherein only when the first flag in its ON state enables turning ON of the second flag and when the second flag is turned ON, the printing means is set into the print data priority mode; and control means for turning ON and OFF the first flag and the second flag, said control means turning ON the second flag when said print data receiving means receives print data while the first flag is in its ON state, wherein said control means turns ON the first flag in response to an instruction instructing to set said printing means into the print data priority mode.

2. A device according to claim 1, further comprising detecting means for detecting facsimile data being received by said facsimile data receiving means and facsimile data being printed by said printing means, wherein when said control means turns ON the first flag while said detecting means is detecting facsimile data, said control means turns ON the second flag when said print data receiving means receives print data.

3. A device according to claim 2, wherein said printing means operates in the print data priority mode after completion of printing of one page worth of facsimile data.

4. A device according to claim 3, further comprising a first timer for measuring a first predetermined time duration starting from a time when said control means turns ON the first flag while said detecting means is detecting facsimile data, wherein said control means turns OFF the first flag when the first predetermined time duration expires before said print data receiving means receives any print data.

5. A device according to claim 4, further comprising:
a second timer for measuring a second predetermined time duration starting from a time when said printing means completes printing print data, wherein said control means turns OFF the first flag and the second flag when the second predetermined time duration expires before said print data receiving means receives subsequent print data.

6. A device according to claim 2, wherein when said control means turns ON the first flag while said detecting means is not detecting facsimile data, said control means turns ON the second flag.

7. A device according to claim 1, wherein said first memory further includes a facsimile data memory for temporary storing facsimile data which is received while the second flag is in its ON state, wherein the facsimile data is deleted from the facsimile data memory after printing.

8. A device according to claim 7, further comprising:
a second memory for storing a plurality of control programs including an interval interruption program for turning ON the first flag, a print data priority mode setting program for turning ON the second flag, a facsimile data printing program for printing facsimile data, and a print data printing program for printing print data;
executing means for regularly executing the plurality of control programs stored in said second memory, said executing means executing the interval interruption program and the facsimile data printing program alternatively, wherein facsimile data is printed for one page while said executing means executing the facsimile data printing program one time.

9. A device according to claim 8, further comprising:
an operation panel having a print data priority mode key, wherein said control means turns ON the first flag when the print data priority mode key is pressed while the first flag is in its OFF state, and said control means turns OFF the first flag when the print data priority mode key is pressed while the first flag is in its ON state.

10. A device with a facsimile function and a printer function, comprising:
a facsimile data reception memory that receives and stores facsimile data transmitted from a remote facsimile device;
a print data reception memory that receives and stores print data inputted from an external device;
a print section that prints the facsimile data and the print data on a print medium;
a print data priority mode key that instructs to set said print section into a print data priority mode allowing said print section to print the print data precedent to the facsimile data; and
control means for controlling said print section, said control means comprising:
first detecting means for detecting whether or not the print data is being received at said print data reception memory, said first detecting means producing a first affirmative output when the print data is being received at said print data reception memory and a first negative output when the print data is not being received at said print data reception memory; and
second detecting means for detecting whether or not the print data priority mode is instructed by said print data priority mode key, said second detecting means producing a second affirmative output when the print data priority mode is instructed by said print data priority mode key and a second negative output when the print data priority mode is not instructed by said print data priority mode key,
wherein only when the first affirmative output and the second affirmative output are produced, said control means sets said print section in the print data priority mode.

11. A device according to claim 10, wherein said control means further comprises third detecting means for detecting whether or not the facsimile data is being received at said facsimile data reception memory, said third detecting means producing a third affirmative output when the facsimile data is being received at said facsimile data reception memory and a third negative output when the facsimile data is not being received at said facsimile data reception memory; and fourth detecting means for detecting whether or not the facsimile data is being printed by said print section, said fourth detecting means producing a fourth affirmative output when the facsimile data is being printed by said print section and a fourth negative output when the facsimile data is not being printed by said print section, wherein when the first affirmative output, the second affirmative output and one of the third affirmative output and the fourth affirmative output are produced, said control means sets said print section in the print data priority mode.

12. A device according to claim 11, wherein when the third negative output and the fourth negative output are produced and when the second affirmative output is produced, said control means sets said print section in the print data priority mode regardless of whether the first affirmative output or the first negative output is produced.

13. An image forming device comprising:
data receiving means for receiving first data and second data;
printing means for printing the first data and the second data on a print medium, said printing means being selectively set into a priority mode in which the first data is given priority to be printed over the second data;
mode setting means for setting the priority mode; and
control means for enabling said mode setting means to set the priority mode, said control means enabling in response to an instruction instructing to set said printing means into the priority mode,
wherein said mode setting means sets the priority mode only when said data receiving means receives the first data while said mode setting means is enabled.

14. The image forming device according to claim 13, further comprising a timer for measuring a predetermined time duration starting from a time when said printing means has completed printing the first data,
wherein when the predetermined time duration expires, said mode setting means cancels the priority mode, and said control means disables said mode setting means.

15. The image forming device according to claim 13, further comprising a timer for measuring a predetermined time duration starting from a time when said control means has started activating said mode setting means,
wherein said control means disables said mode setting means when the predetermined time duration expires before said data receiving means receives the first data.

16. The image forming device according to claim 15, wherein said timer further measures another predetermined time duration starting from a time when said printing means has completed printing the first data, wherein when the predetermined time duration expires, said mode setting means cancels the priority mode, and said control means disables said mode setting means.

17. An image forming device comprising:

data receiving means for receiving first data and second data;

printing means for printing the first data and the second data, said printing means being selectively set into a priority mode in which the first data is given priority to be printed over the second data;

mode setting means for setting the priority mode;

control means for enabling said mode setting means to set the priority mode, said control means enabling in response to an instruction instructing to set the priority mode; and detecting means for detecting the second data which is either being received by said data receiving means or being printed by said printing means, wherein when said control means enables said mode setting means only while said detecting means is not detecting the second data, said mode setting means sets the priority mode.

18. A device with a facsimile function and a printer function performed selectively in a print data priority mode in which print data is given priority to be printed over facsimile data, comprising:

facsimile data receiving means for receiving facsimile data transmitted from a remote facsimile device;

print data receiving means for receiving print data inputted from an external device;

printing means for printing the facsimile data and the print data on a print medium;

a first memory including a first flag and a second flag both selectively turned ON and OFF, the first flag in its ON state enabling to set said printing means into the print data priority mode, the second flag in its ON state indicating that the printing means has being set into the print data priority mode; and control means for turning ON and OFF the first flag and the second flag, said control means turning ON the second flag only when said print data receiving means receives print data while the first flag is in its ON state, wherein said control means turns ON the first flag in response to an instruction instructing to set said printing means into the print data priority mode.

* * * * *